July 7, 1964  A. C. SCINTA  3,139,645
WINDSHIELD WIPER
Filed Feb. 2, 1961  2 Sheets-Sheet 1
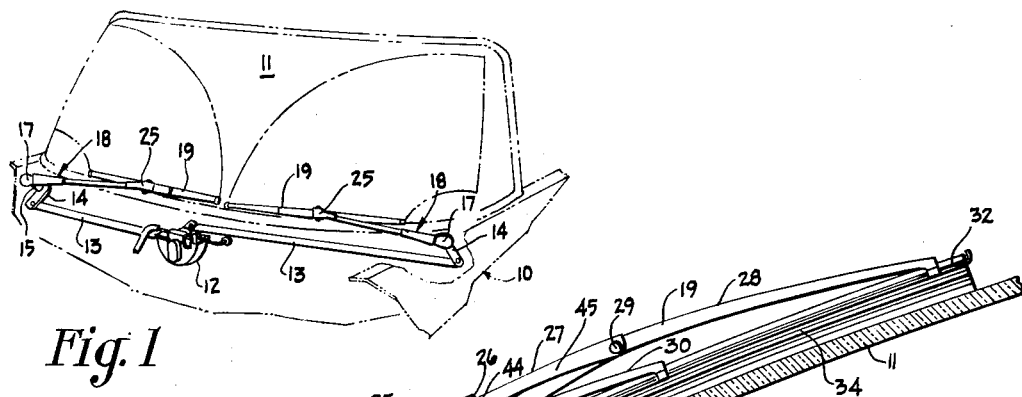
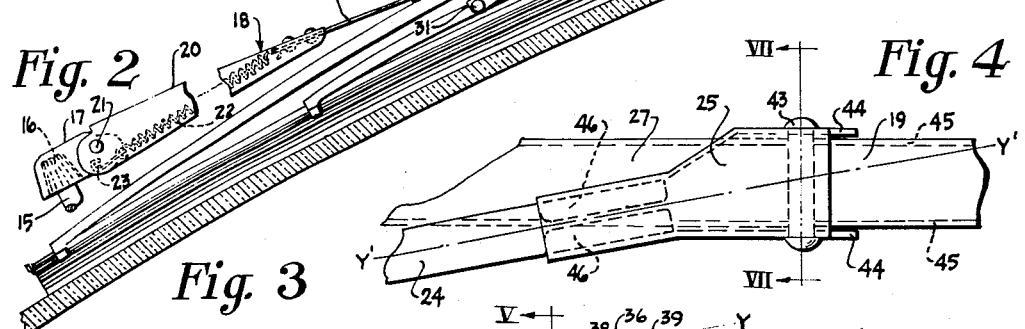
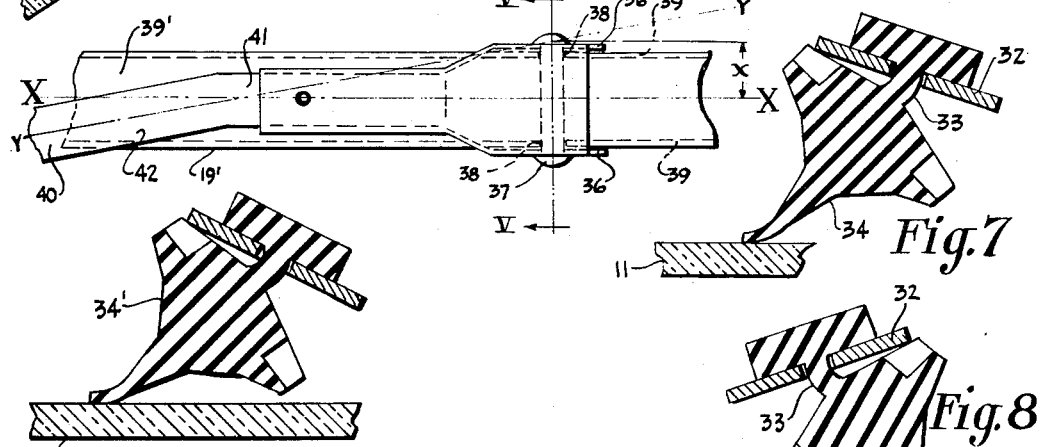
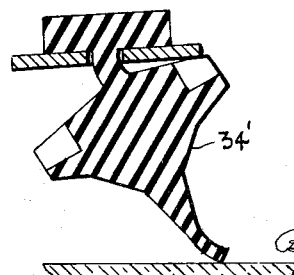
INVENTOR.
ANTHONY C. SCINTA
BY
Bean Brooks Buckley & Bean
ATTORNEYS

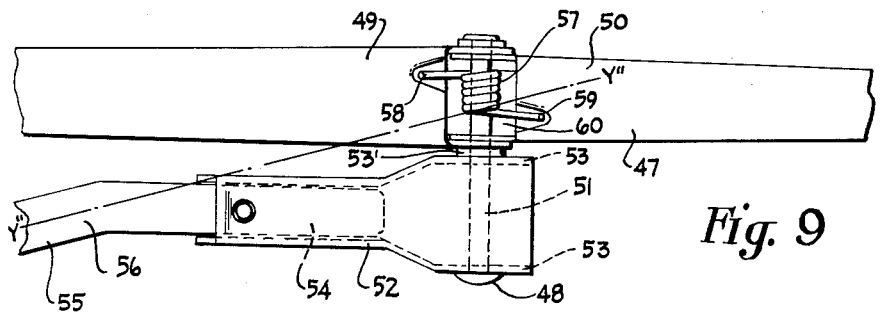
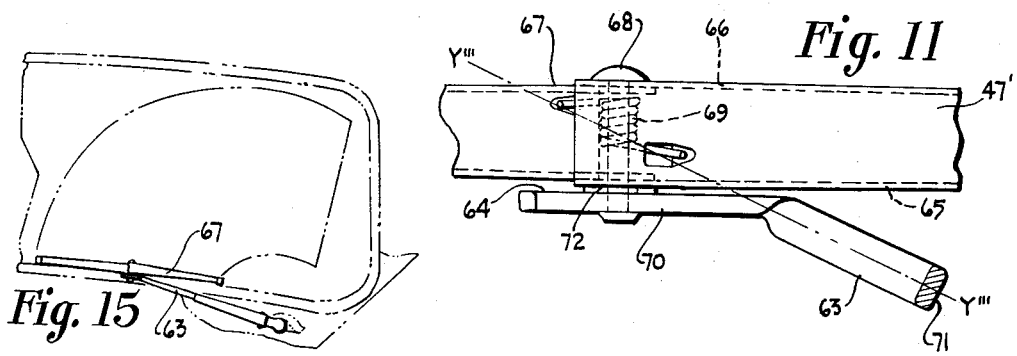
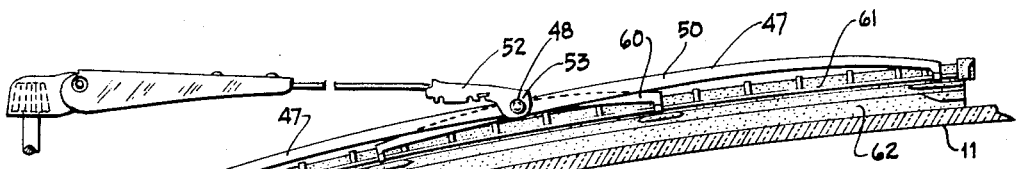
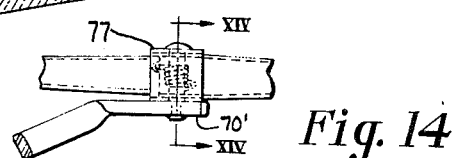
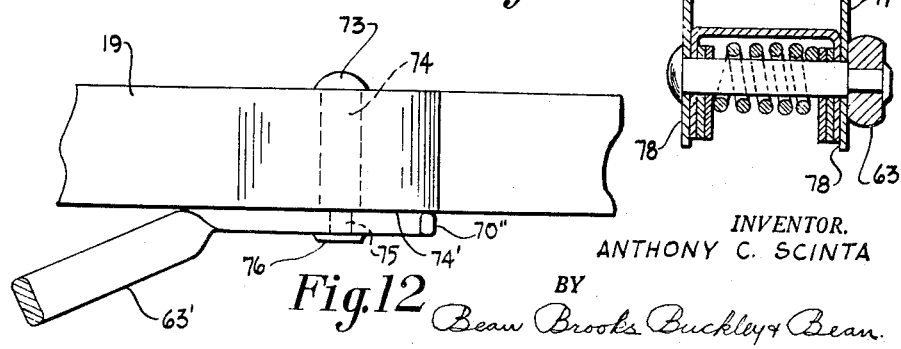

United States Patent Office 3,139,645
Patented July 7, 1964

3,139,645
WINDSHIELD WIPER
Anthony C. Scinta, Hamburg, N.Y., assignor to Trico
Products Corporation, Buffalo, N.Y.
Filed Feb. 2, 1961, Ser. No. 86,720
7 Claims. (Cl. 15—250.32)

The present invention relates to an improved construction for mounting a windshield wiper on a wiper arm.

In accordance with current conventional practice, a wiper arm is mounted on the end of a drive shaft protruding from the vehicle cowl below the windshield. However, since it is desirable that the wipers be substantially parallel to the lower edge of the windshield when they are parked, the outer ends of the wiper arms on which the wipers are mounted are formed to extend at an angle to the axis of the major portion of the arms. In the foregoing arrangement, the extension of the longitudinal axis of the major portion of the wiper arm is laterally offset from the centerline of the wiper at the point where the wiper clip is affixed to it. This offset results in the wiper's having a greater layover in one direction of travel than it does in the opposite direction because of the difference in the manner in which the forces are transmitted to the wiper by the arm. The difference in wiper layover, in turn, causes a variation in the quality of the wipe which is obtained.

It is accordingly an important object of the present invention to provide a windshield wiper and arm combination which produces an improved wipe because the wiper is caused to lay over substantially equally in both directions of travel and therefore provide an optimum wipe in both directions notwithstanding that the wiper extends generally at an angle to the longitudinal axis of the major portion of the arm.

Another object of the present invention is to provide an extremely simple mode of attaching a wiper arm to a wiper to provide substantially equal layover of the wiper in opposite directions of travel.

Still another object of the present invention is to provide a simple and economical mounting for attaching a wiper to a wiper arm without using a clip, regardless of whether equal layover in both directions of travel is obtained.

A further object of the present invention is to provide an arrangement for mounting a wiper on the end of a wiper arm in such a manner that the wiper arm is not visible from within the vehicle when the wiper is in a parked position. Other objects and attendant advantages of the present invention will readily be perceived hereafter.

In accordance with one embodiment of the present invention which provides equal layover, the clip which fastens the wiper to the arm is asymmetrical. The geometry of the wiper arm, wiper, and clip is such that the extension of the longitudinal axis of the major portion of the arm will intersect and preferably bisect the pin which serves as a connection between the wiper and the clip. This will cause the force provided by the wiper arm to be applied substantially equally in both directions of wiper travel. Thus an equal twisting force will be applied to the wiper in both directions of its travel and its layover will therefore be the same in both directions. Since the area of contact between the wiper lip and the windshield will thus tend to be the same in both directions, there will be no variation in the quality of the wipe.

In accordance with another embodiment of the present invention, the asymmetrical clip is eliminated and the bar stock at the end of the wiper arm is twisted so that a portion thereof has a surface which lies substantially parallel to the side surface of the wiper superstructure. These surfaces are then placed in parallel, substantially abutting relationship and the wiper superstructure is riveted or otherwise pinned to the twisted portion of the arm. This mounting eliminates the clip heretofore required. Furthermore, it is to be especially noted that this type of mounting permits the major axis of the arm, when extended, to intersect the pin, which fastens the wiper to the arm, between the ends thereof to thereby tend to provide the above-mentioned equal wiper layover in both directions.

Further in accordance with the present invention the above-described clipless construction provides a convenient and economical mode for attaching a wiper to a wiper arm even though the geometry of a particular automotive installation does not permit constructing the arm and blade to provide the equal layover noted above. In other words a rivet may be used to fasten the twisted end of a wiper arm to the wiper, thereby eliminating the clip normally used, but in certain circumstances the axis of the major portion of the wiper arm need not necessarily intersect the center of the pin which attaches the arm to the wiper.

Since the wiper arm is fastened to one side of the wiper, namely, the lower side, when the wiper is in its parked position at the center of the windshield, the outer end portion of the wiper arm is not at all visible from within the vehicle and therefore can in no way obstruct the operator's vision. In this respect, since the wiper arm is fastened at the side of the wiper and does not have to extend across the top thereof as in prior art installations, the silhouette of the wiper and arm combination is greatly lowered. The present invention will be more fully understood when the following portions of the specification are read in conjunction with the accompanying drawings wherein:

FIG. 1 is a fragmentary perspective view of an automotive vehicle showing one embodiment of the improved wiper mounting arrangement of the present invention;

FIG. 2 is an elevational view of the wiper mounted on a windshield;

FIG. 3 is a plan view showing a conventional wiper and arm mounting;

FIG. 4 is a plan view showing the manner in which a wiper is mounted on an arm in accordance with one embodiment of the present invention;

FIG. 5 is a cross sectional view taken along line V—V of FIG. 3 showing the amount of wiper layover experienced when the wiper of FIG. 3 is moving in a counterclockwise direction about the rockshaft axis, certain elements of the wiper superstructure being omitted in the interest of simplicity;

FIG. 6 is a cross sectional view taken along line V—V of FIG. 3 showing the layover experienced by the wiper of FIG. 3 moving in a clockwise direction about the rockshaft axis, certain portions of the superstructure being omitted in the interest of simplicity;

FIG. 7 is a cross sectional view taken along line VII—VII of FIG. 4 when the construction of FIG. 4 is moving in a counterclockwise direction about the rockshaft axis, certain portions of the wiper superstructure being omitted in the interest of simplicity;

FIG. 8 is a cross sectional view taken along line VII—VII of FIG. 4 when the construction of FIG. 4 is moving in a clockwise direction about the rockshaft axis, certain portions of the wiper superstructure being omitted in the interest of simplicity;

FIG. 9 is a plan view of a modified way in which the clip may be attached to the wiper arm;

FIG. 10 is an elevational view of the embodiment of FIG. 9;

FIG. 11 is still a further modification of the present invention showing a clipless manner of attaching the end of the wiper arm to the wiper;

FIG. 12 shows the attachment of a type similar to FIG. 11 affixed to a different type of wiper;

FIG. 13 shows a further modification of the present invention wherein an attachment such as FIG. 11 is provided with a reinforcing arrangement;

FIG. 14 is a view taken along line XIV—XIV of FIG. 13; and

FIG. 15 is a fragmentary perspective view of an automotive vehicle showing further how the mounting of certain embodiments of the present invention causes the wiper arm to be maintained out of the vision of the vehicle operator when the wiper is parked.

In FIG. 1 an automotive vehicle 10 is shown having a windshield 11 mounted thereon in the conventional manner. Suitably mounted underneath the cowl or on the fire wall of the vehicle is a wiper motor 12. Links 13 have one end thereof suitably connected for driving engagement by motor 12 and the other ends thereof suitably pinned to the outer ends of crankarms 14 which are fixedly mounted on rockshafts 15 which are journaled for rotation in the cowl of the vehicle. Rockshafts 15 (FIG. 2) have serrated burrs 16 at the ends thereof which are opposite to their connection with rockshafts 15 for receiving mounting head portions 17 of wiper arm 18 which mount wipers 19 at the outer ends thereof. As is well known in the art, when wiper motor 12 is placed in operation, wipers 19 will be caused to oscillate back and forth across the windshield to remove moisture therefrom.

Wiper arm 18 (FIG. 2) may be of conventional construction and include the mounting head portion 17 to which is pivotally attached the spring chamber 20 by pin 21. A spring 22 extends between an anchoring portion (not numbered) in spring chamber 20 and a pin 23 in the mounting head portion 17. The outer end of spring chamber 20 mounts bar stock member 24 which is received in clip 25 pivotally secured to wiper 19 by pin 26. Wiper 19 may also be of conventional construction containing levers 27 and 28 pivotally coupled to each other by pin 29. Lever 28 has pressure equalizer 30 pivotally coupled thereto by pin 31. The ends of pressure equalizer 30 and levers 28 and 27 are formed into fingers which are mounted on metallic flexible backing strip 32 having a slot therein which receives the neck 33 (FIGS. 7 and 8) of wiping element 34. The fingers are formed in pairs and three sets of the fingers slidably engage the backing strip to permit it to conform to the curved windshield while at least one of the remaining fingers is securely fastened to the backing strip to prevent separation of the backing strip from the superstructure consisting of the levers and pressure equalizer noted above. Since wipers such as 19 for curved windshields are well known in the art, it is deemed that no further explanation of its mode of operation need be given here.

As can be seen from FIG. 1, the rockshafts 15 which protrude from the cowl of the vehicle are located below the lower molding of the windshield and therefore if the wipers 19 are to occupy a position parallel to the lower molding of the windshield when they are parked, there must be an angle between the longitudinal axis of the arm 18 and the longitudinal axis of the wiper 19.

Heretofore the clip for connecting the arm to the wiper was symmetrical with the wiper axis, as indicated by clip 35 in FIG. 3. More specifically, clip 35 had depending ears 36, and pin 37 extended through aligned apertures (not shown) in ears 36 and aligned apertures 38 in the legs 39 of channel shaped lever 39'. Furthermore, because of this symmetrical relationship, the bar stock 40 at the end of the wiper arm had to be bent so that the axis X—X of its outer end portion 41 was at an angle to the major axis Y—Y of arm 18, axis Y—Y also, in this particular instance, being the longitudinal axis of arm portion 42 which is adjacent to arm portion 41. However, the axis Y—Y of portion 42 when extended was displaced from the mid point of rivet 37 by the amount x, as can be seen from FIG. 3. This caused the force provided by the wiper arm to be applied unequally to the wiper when the latter was traveling in different directions. More specifically, assuming that the wiper 19' of FIG. 3 was mounted on the left rockshaft 15 of FIG. 1, when wiper 19' was traveling in a counterclockwise direction (during its outboard stroke), the wiper element 34' carried thereby would assume the attitude shown in FIG. 5 (when viewed in the direction of line V—V of FIG. 3). Because of the offset x between the axis of arm portion 43 (FIG. 3) and the mid point of pin 37, the arm force provided a moment which when combined with the moment provided by the force of friction between the wiper element 34' and the windshield 11 produced a resultant force acting on the wiper which gave the layover of FIG. 5. On the other hand, when the wiper, mounted on left rockshaft 15 of FIG. 1, was traveling in a clockwise direction, it assumed the attitude shown in FIG. 6 when viewed from line V—V of FIG. 3. In this instance there was less layover than when the wiper was traveling in the other direction because the moment due to the offset between the axis Y—Y of arm portion 42 and the center of rivet 38 acted differently than when the wiper was traveling in the opposite direction, and therefore produced a different resultant when combined with the other forces acting on the wiper. However, for proper operation the wiper of FIG. 3 must be designed to give a certain minimum layover, otherwise it will produce chatter and when this minimum layover is provided, as shown in FIG. 6, there will be an excessive layover when the wiper is traveling in the opposite direction wherein the force moments act differently on the wiper than when it is traveling in the direction which gives the layover of FIG. 6. In other words, if the wiper 19 is designed to give the optimum layover when the greatest turning forces are applied thereto, it will not give sufficient layover when lesser forces are applied thereto when it is traveling in an opposite direction, and therefore chatter will be experienced when such insufficient layover is obtained. It will readily be appreciated that with such prior art construction the wipe varies with the direction of travel because there are different areas of blade lip in contact with the windshield during opposite strokes. Furthermore the loading of the wiper motor varies because of these differences in areas of contact during opposite strokes. However, the construction of the embodiment of FIGS. 4, 7 and 8 of the present invention provides equal wiper layover in both directions of wiper travel. This is achieved by causing the longitudinal axis Y'—Y' of bar stock portion 24, which is also the major axis of arm 18, when extended, and which extends at an angle to the longitudinal axis of the wiper, to intersect the mid point of rivet 43 which fastens clip 25 to wiper 19 through aligned apertures (not shown) in ears 44 and aligned apertures (not shown) in the sides 45 of channel shaped lever 27. The embodiment of FIG. 4 causes the above relationship to exist because clip 25 is asymmetrical, as can be seen from FIG. 4. Accordingly, since the axis Y'—Y' of the arm portion 24 is not offset from the center of the rivet 43, the arm force is applied equally to the wiper in both directions of its travel to thereby cause equal layover in both directions, as can be seen from FIGS. 7 and 8.

The clip 25 of FIG. 4 is shown as being fixedly secured to bar stock portion 24 because tabs 46 are clamped on the end of bar stock portion 24. In contrast to this the end portion 41 of the arm shown in FIG. 3 is detachably held in clip 35 by a connection such as taught in Patent No. 2,807,822. It will readily be appreciated, however, that the particular mode of connecting the end of the wiper arm to the clip is not critical and that either of the above-described types of connections could be substituted for the other without losing the inventive concept of the embodiment of FIG. 4. Furthermore, it will be appreciated that bar stock portion 24 of FIG. 4 can be bent and need not necessarily be straight, as shown, as long as the major axis of the arm, which is analogous to axis Y—Y of FIG. 3, when extended, substantially passes through the central portion of rivet 43. It is understood that in some instances the geometry of a particular wiper installation will not permit the axis of the arm to extend through the exact mid point of the rivet. In such installations, however, the major axis of the arm, such as Y—Y of FIG. 3 or Y'—Y' of FIG. 4, when extended, should fall between the opposite ends of the rivet and as close to the center as the geometry of the particular installation will permit to thereby come as close as possible to obtaining the equal layover discussed above.

Another embodiment of the present invention is shown in FIG. 9 wherein the wiper 47 has an elongated pin 48 extending through aligned apertures (not shown) in the two levers 49 and 50 and has an extension 51 on which is mounted a clip 52, the extension 51 extending through aligned apertures (not numbered) in ears 53 of clip 52. A washer 53' is interposed between one of the ears 53 and the side of lever 49. It will be noted that the end 54 of bar stock portion 55 of the wiper arm fits into clip 52 in the same manner noted above with respect to the clip of FIG. 3. It is to be further noted that the portion 56 of the bar stock 55 which is adjacent portion 54 has an axis Y"—Y" which, when extended, crosses the central portion of elongated pin 48 located between the sides of levers 49 and 50. The foregoing construction tends to provide equal layover in both directions as discussed above with respect to the embodiment of FIG. 4. It is to be noted that axis Y"—Y" does not intersect the exact center of the portion of pin 48 between the sides of lever 49. The intersecting of the exact center would be preferable, but, as noted above, the geometry of a particular installation might require that the axis Y"—Y" be offset from the exact center, and therefore the embodiment of FIG. 9 would only tend to give equal layover.

It is to be noted that wiper 47 (FIG. 9 and FIG. 10) is of a different construction than the wiper of FIG. 2. However, this fact is immaterial insofar as the present invention is concerned inasmuch as the difference in wiper construction does not affect the manner in which the present invention operates. Briefly, wiper 47 includes levers 50 and 49 which are pinned to each other by pin 48. A torsion spring 57 encircles pin 48 and the ends 58 and 59 of spring 57 bear on levers 49 and 50, respectively, to bias the outer ends of these levers toward an associated windshield. A pressure equalizer 60 is also mounted on pin 48. The outer ends of levers 47 and 49 and the ends of pressure equalizer 60 are mounted on flexible backing strip 61 which mounts wiping element 62. Levers 47, 49 and pressure equalizer 60 are of channel shaped cross sectional configuration for the major portions of their length.

A still further embodiment of the present invention is shown in FIG. 11. In this embodiment the arm and wiper are fastened directly to each other, thereby dispensing with the clip used in FIGS. 4 and 9. More specifically, the end of the wiper arm, namely, the bar stock 63 is twisted so that the wider surface 64 of the bar stock lies substantially parallel to the legs 65 and 66 of lever 47' of wiper 67 when pin 68, in this instance a rivet, secures wiper 67 to the wiper arm. The wiper of FIG. 11 is generally of the same construction described above with respect to FIG. 10 except for the variation in the way spring 69 is installed. In other words the twisting of bar stock 63 causes the wider surface 64 to lie in a plane which is substantially perpendicular to the plane in which the surface 71 lies, surfaces 64 and 71 having lain in the same plane before the end portion 70 of the arm was twisted. If desired, a washer 72 may be provided on rivet 68 to provide spacing between leg 65 and the surface 64. However, whether or not a washer such as 72 is used, there must be relatively large bearing surfaces between the end of the arm and the wiper to prevent undesired play. It will be noted from FIG. 15 that when wiper 67 is in a parked position bar stock 63 lies below the vehicle operator's line of vision and therefore does not in any way obstruct it. It will also be noted that the axis Y'''—Y''' of bar stock 63, when extended, passes through the central portion of pin 68 lying between legs 65 and 66.

Still another embodiment of the present invention is shown in FIG. 12 wherein the bat stock 63' at the outer end of the arm is deformed in the same manner as shown in FIG. 11. In FIG. 12, however, the wiper itself is of the same construction as wiper 19 of FIG. 2, without the spring encircling the rivet. Furthermore rivet 73, it will be noted, has a relatively large diameter portion 74 throughout the major length thereof and a reduced portion 75 which is headed at 76. The relatively thick portion 74 provides greater support for the wiper than a thinner rivet. Furthermore it will be noted that the wide face 74' abuts the side of the wiper and thus a good bearing surface is provided between the end of bar stock 63 and the wiper 19.

A still further embodiment of the present invention is shown in FIGS. 13 and 14 wherein, in addition to the structure disclosed in FIG. 11, an inverted U-shaped brace 77 is provided with depending legs 78, the brace adding rigidity to the entire construction.

In the embodiments of FIG. 9, the entire wiper, including the wiping element and superstructure, is detachable from the end of the arm for replacement. However, it can readily be seen that in the constructions of FIGS. 4, 11, 12, 13, and 14 the wiper cannot be detached from the end of the arm for replacement. These wipers may therefore possess wiping element and backing strip units which are removable from the superstructure of the wipers for replacement in accordance with the teaching of copending application Serial No. 43,943, filed July 19, 1960.

It can thus be seen that a plurality of embodiments of the present invention have been disclosed which will tend to provide equal layover of a wiper when it travels in opposite directions. Furthermore a novel mode of attaching a wiper to an arm has been disclosed which eliminates the wiper clip heretofore used. Moreover, while the axes of the arm used with the wipers of the present invention have been shown as intersecting substantially the central portion of the rivet connecting the wiper arm to the wiper, it will of course be appreciated that it is also within the purview of the present invention to attach the twisted end of a wiper arm to a wiper by means of a pin even though the axis of the wiper arm may not necessarily intersect either the exact center or the general central portion of the pin between the sides of the superstructure. In other words, in addition to the blade layover equalizing aspect of the present invention, it is to be understood that the mode of attaching the bar stock to a wiper by means of a pin also constitutes an aspect of the present invention notwithstanding that such connection may not necessarily provide the blade layover equalizing noted above. Thus the geometry of a particular installation may cause the major axis of the arm to intersect the portion of the pin lying within the sides of the superstructure but not necessarily at the mid point of this portion of the pin. Such a construction will tend to give the desired equal layover notwithstanding that it cannot give exact equal layover because of the failure of the major axis of the arm, when extended, to intersect the mid point of the pin. It will be appreciated, however, that in certain instances by changing the length of the twisted end portion of the bar stock of the arm, such as changing the lengths of portions 70 of FIG. 11 or portion 70′ of FIG. 13 or portion 70″ of FIG. 12, the axis of the major portion of the bar stock adjacent to the twisted end portion can be made to intersect the mid point of the pin in various types of installations. It will of course be appreciated that if the twisted end portion such as 70 in FIG. 10 is lengthened, it must have a correspondingly greater thickness to prevent excessive twisting inasmuch as such lengthened portions are more susceptible to twisting when the wiper is in operation.

Furthermore, it will be appreciated that while all the depicted embodiments of the present invention show constructions which either give equal layover or layover which tends to be equal (when the major axis of the arm does not intersect the exact center of the pin which mounts the wiper), the present invention includes the aspect of attaching the twisted end of a wiper arm to a wiper by a rivet to thereby eliminate a clip, even though the major axis of the arm does not necessarily intersect the portion of the pin within the sides of the wiper. In the latter type of clipless construction, the advantage is economy, notwithstanding that neither equal layover nor the tendency for equal layover are obtained.

While the foregoing portions of the specification and certain of the appended claims refer to the bar stock portion of the wiper arm having its outer end twisted relative to the portion adjacent thereto, it is to be understood that the term "twisted" is merely meant to indicate the spacial relationship between the wide portions of the bar stock which results in the wide face of the outer end portion of the bar stock lying in a plane which is substantially perpendicular to the surface of the windshield and the inner wide face portion of the bar stock lying in a plane which is substantially parallel to the surface of the windshield. By providing the above orientation of the faces of the bar stock, it will be seen that the outer end portion which has a surface lying in a plane perpendicular to the surface of the windshield provides a large surface for mounting a wiper holding member, such as the pin or rivet used in the present invention. Furthermore, since the inner portion of the bar stock lies in a plane which is substantially parallel to the surface of the windshield, this portion provides very great resistance against lateral deflection. It will further be appreciated that the wiper-carrying member of the arm need not be fabricated into its finished shape by torsion, but can be fabricated into a "twisted" condition by forging or swaging or the like. Furthermore, if desired, the portion adjacent the outer end of the wiper-carrying portion need not necessarily be of the same cross sectional configuration as the outer end portion of the arm.

While preferred embodiments of the present invention have been disclosed, it is to be understood that the present invention is not necessarily limited thereto, but may be otherwise embodied within the scope of the following claims.

What is claimed is:

1. In combination with a wiper arm having a first longitudinal axis, a wiper having sides with a second longitudinal axis lying therebetween, a clip having a first portion attached to said arm and colinear therewith and an asymmetrical second portion rigid with said first portion attached to said wiper in telescopic engagement and contiguous therewith, a pin extending substantially perpendicularly to said second axis at an angle to said first axis, said pin being affixed between the sides of said wiper for pivotally mounting said wiper on said clip about an axis transverse to said second portion and rigid about an axis perpendicular to said pin, said clip being asymmetrical to cause said first axis to lie at an angle to said second axis and to cross the portion of said pin lying substantially centrally between said sides to thereby cause the wiper to lay over equally in both directions of wiper travel.

2. In combination with a wiper arm having a first longitudinal axis, a wiper having a second longitudinal axis, a clip having a first portion rigidly attached to said arm and colinear therewith and an asymmetrical second portion rigid with said first portion telescopically attached to said wiper, a pin extending substantially perpendicularly to said second axis and at an angle to said first axis, said pin pivotally mounting said wiper on said clip about an axis transverse to said second portion and rigid about an axis perpendicular to said pin, said clip being asymmetrical to cause said first axis to lie at an angle to said second axis and to cross said second axis at substantially the point of intersection of the axis of said pin and said second longitudinal axis to thereby cause arm pressure to be applied to said wiper equally in both directions of wiper travel.

3. In a power driven windshield wiper assembly for use on a vehicle, a wiper arm having a first longitudinal axis and an outer end portion having its axis angularly disposed relative to said first longitudinal axis, a wiper having sides and a second longitudinal axis located between said sides, a pin extending through said wiper substantially perpendicularly to said second axis and having an extended portion extending laterally of one of said sides of said wiper, a clip having a third longitudinal axis mounted on said laterally extending portion so that said clip is positioned entirely on one side of said second longitudinal axis with said third longitudinal axis and said second longitudinal axis extending in the same direction, said clip receiving said outer end portion and causing said first axis to lie at an angle to said second axis and cross said pin between the sides of said wiper to thereby tend to cause the wiper to lay over equally in both directions of its travel.

4. In a power driven windshield wiper assembly for use on a vehicle, a wiper arm having a first longitudinal axis, a wiper having a second longitudinal axis, said wiper arm having the outer end portion thereof twisted relative to the arm portion adjacent thereto, said outer end portion having a third longitudinal axis which extends at an angle to said first longitudinal axis, and pin means mounting said wiper on said outer end portion of said wiper arm which is located to one side of said wiper to cause said second and third axes to extend in generally the same direction while causing said first axis when extended to intersect said pin substantially at the point where its longitudinal axis intersects said second longitudinal axis to thereby tend to cause said wiper to lay over equally in both directions of its travel.

5. In combination a wiper arm having a mounting head portion and a wiper carrying portion, said mounting head portion and said wiper carrying portion lying along a first longitudinal axis, a wiper having a second longitudinal axis, a clip having a first portion rigidly attached to said wiper carrying portion of said arm, a pin extending substantially perpendicular to said second axis and at an angle to said first axis and adapted to be affixed to said wiper for mounting said clip on said wiper pivotally about a transverse said axis and rigidly about an axis perpendicular to said clip, said clip being asymmetrical to cause said first axis to lie at an angle to said second axis and cross said pin between the ends thereof to thereby tend to cause said wiper to lay over equally in both directions of wiper travel.

6. A wiper and arm combination for a power driven windshield wiper assembly for use on a vehicle comprising a wiper having a wiping element and a superstructure for mounting said wiping element, said superstructure including a generally channel shaped member having a side including a planar portion, said arm including a mounting head portion and a wiper carrying portion operatively mounted thereon, said wiper carrying portion comprising a bar stock member having a wide face, said bar stock member including an outer end portion which is twisted relative to the bar stock portion adjacent thereto whereby said wide face of said twisted outer end portion lies in a first plane which intersects a second plane containing the wide face of said bar stock portion adjacent to said twisted outer end portion, and pin means for connecting said twisted outer end portion of said bar stock member to said superstructure of said wiper whereby said first plane is substantially parallel to said planar portion of said superstructure.

7. A wiper and arm combination as set forth in claim 6 wherein said first and second planes are substantially perpendicular to each other and said planar portion and said wide face of said twisted outer end portion are in effective abutting relationship.

References Cited in the file of this patent

UNITED STATES PATENTS

| | | |
|---|---|---|
| 2,432,692 | Smulski | Dec. 16, 1942 |
| 2,751,620 | Ehrlich | June 26, 1956 |
| 2,852,796 | Leins | Sept. 23, 1958 |